(12) United States Patent
Savagaonkar

(10) Patent No.: US 8,549,254 B2
(45) Date of Patent: *Oct. 1, 2013

(54) USING A TRANSLATION LOOKASIDE BUFFER IN A MULTIPLE STAGE MEMORY ADDRESS TRANSLATION STRUCTURE TO MANAGE PROTECTED MICROCONTEXTS

(75) Inventor: Uday R. Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/967,523

(22) Filed: Dec. 31, 2007

(65) Prior Publication Data

US 2009/0172343 A1    Jul. 2, 2009

(51) Int. Cl.
*G06F 12/10* (2006.01)
*G06F 9/46* (2006.01)

(52) U.S. Cl.
CPC ............ *G06F 12/1009* (2013.01); *G06F 9/461* (2013.01); *G06F 12/1027* (2013.01); *G06F 2212/651* (2013.01)
USPC ............ 711/207; 711/E12.059; 711/E12.061; 712/228

(58) Field of Classification Search
USPC .................................. 711/206–208
See application file for complete search history.

(56) References Cited

U.S. PATENT DOCUMENTS

| | | | | |
|---|---|---|---|---|
| 3,614,746 | A * | 10/1971 | Klinkhamer ................. | 711/206 |
| 5,101,485 | A * | 3/1992 | Perazzoli, Jr. ................ | 711/206 |
| 5,790,979 | A * | 8/1998 | Liedtke ......................... | 711/206 |
| 5,873,127 | A * | 2/1999 | Harvey et al. ................ | 711/206 |
| 7,111,145 | B1 * | 9/2006 | Chen et al. .................... | 711/206 |
| 7,124,275 | B2 * | 10/2006 | Gammel et al. .............. | 711/203 |
| 2006/0026384 | A1 * | 2/2006 | Brandt et al. ................. | 711/209 |
| 2009/0172341 | A1 * | 7/2009 | Durham et al. ............... | 711/206 |
| 2009/0327648 | A1 * | 12/2009 | Savagaonkar et al. ........ | 711/207 |

OTHER PUBLICATIONS

Jochen Liedtke. "Page Table Structures for Fine-Grain Virtual Memory." Oct. 1994. GMD Technical Report No. 872.*

Jonathan S. Shapiro, Jonathan M. Smith, and David J. Farber. "EROS: a fast capability system." Dec. 1999. ACM. SOSP 1999.*

(Continued)

*Primary Examiner* — Nathan Sadler

(74) *Attorney, Agent, or Firm* — Trop, Pruner & Hu, P.C.

(57) ABSTRACT

Embodiments of an invention for using a translation lookaside buffer to manage protected micro-contexts are disclosed. In one embodiment, an apparatus includes an interface and memory management logic. The interface is to perform a transaction to fetch information from a memory. The memory management logic is to translate an untranslated address to a memory address. The memory management logic includes a storage location, a series of translation stages, determination logic, and a translation lookaside buffer. The storage location is to store an address of a data structure for the first translation stage. Each of the translation stages includes translation logic to find an entry in a data structure based on a portion of the untranslated address. Each entry is to store an address of a different data structure for the first translation stage, an address of a data structure for a successive translation stage, or the physical address. The determination logic is to determine whether an entry is storing an address of a different data structure for the first translation stage. The translation lookaside buffer is to store translations.

20 Claims, 3 Drawing Sheets

(56) References Cited

OTHER PUBLICATIONS

Gil Neiger, Amy Santoni, Felix Leung, Dion Rodgers, and Rich Uhlig. Intel Virtualization Technology: Hardware support for efficient processor virtualization. Aug. 2006. Intel Technology Journal.*
Stephen T. Jones et al. "Antfarm: Tracking Processes in a Virtual Machine Environment." Jun. 2006. USENIX. Annual Technical Conference.*
Intel. Intel 64 and IA-32 Architectures Software Developer's Manual. Nov. 2006. Intel. vol. 3A. pp. 3-1-3-52 and 6-1-6-21.*
Paul Barham et al. "Xen and the Art of Virtualization." Oct. 2003. ACM. SOSP '03. pp. 163-177.*
Yousef A. Khalidi and Madhusudhan Tallui. "Improving the Address Translation Performance of Widely Shared Pages." Feb. 1995. Sun Microsystems Laboratories. TR-95-38.*
Masahiko Takahashi et al. "Efficient Kernel Support of Fine-Grained Protection Domains for Mobile Code." 1999. IEEE. ICDCS '99.*

* cited by examiner

USING A TRANSLATION LOOKASIDE BUFFER IN A MULTIPLE STAGE MEMORY ADDRESS TRANSLATION STRUCTURE TO MANAGE PROTECTED MICROCONTEXTS

BACKGROUND

1. Field

The present disclosure pertains to the field of information processing, and more particularly, to the field of memory management and protection.

2. Description of Related Art

Memory based attacks are a significant threat to the security of information processing systems. Some such attacks involve storing malicious code such as a virus or a worm in the memory of a computer system, then exploiting bugs and/or buffer overflows while running legitimate programs to transfer control to the malicious code. One approach to preventing this type of attack is to divide the address space of a process or a context into a number of smaller "micro-contexts" so that program functions, modules, or other components, or portions of components, may be assigned to a micro-context and securely executed within a process, context, or execution environment, such as a virtual machine. Micro-context switches may be monitored, for example, by trapping to a virtual machine monitor ("VMM"), to protect these components from other program components, including program components operating at higher privilege level.

BRIEF DESCRIPTION OF THE FIGURES

The present invention is illustrated by way of example and not limitation in the accompanying figures.

DETAILED DESCRIPTION

Embodiments of an invention for using a translation lookaside buffer to manage protected micro-contexts are described. In this description, numerous specific details, such as processor and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

As described in the background section, micro-contexts may be managed and protected by trapping a micro-context switch to a virtual machine monitor, operating system, or other supervisory program. Embodiments of the present invention provide for switching between protected micro-contexts to occur without a virtual machine exit, exception, or other control flow change that would consume many clock cycles. Embodiments of the present invention also provide for sharing and updating of data between micro-contexts, without the performance penalty that would be imposed by using micro-contexts switches to maintain the shared data.

Figure 1:
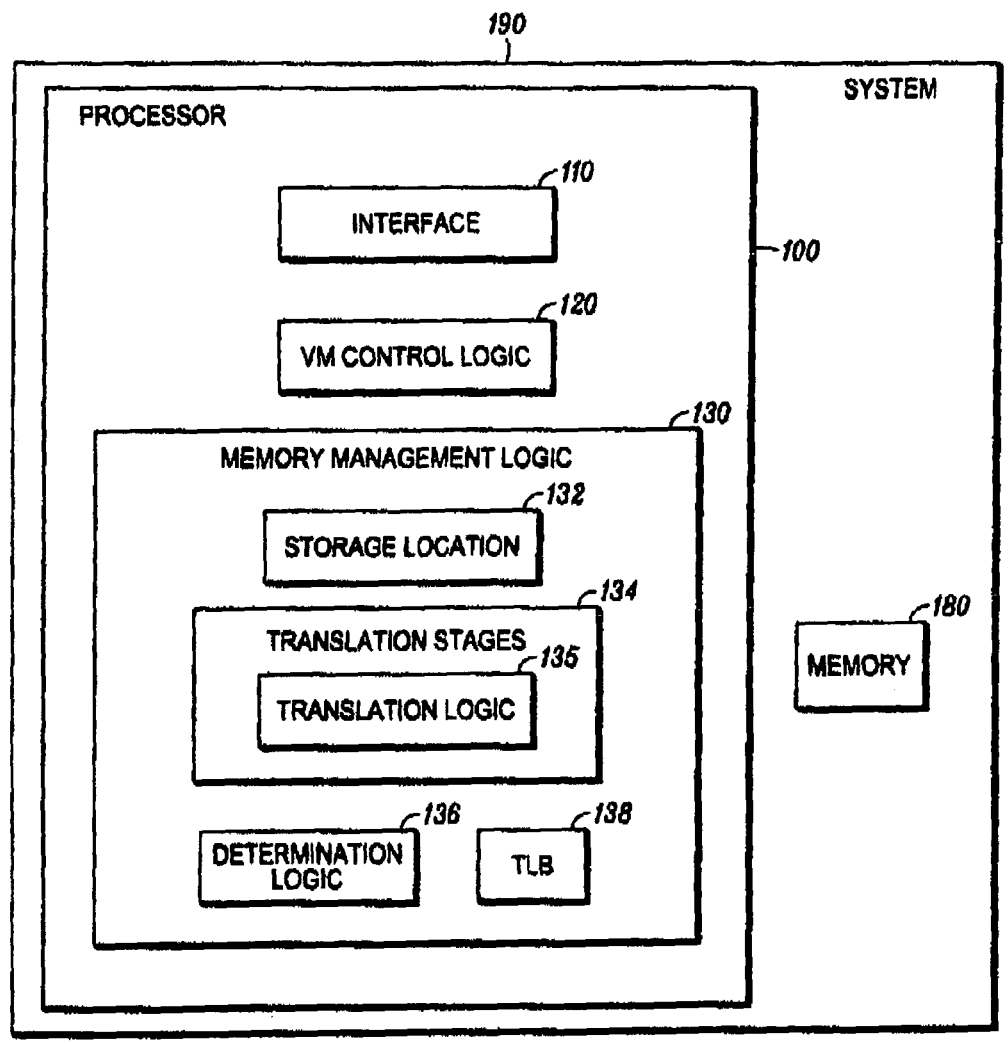
FIG. 1 illustrates a processor that supports using a translation lookaside buffer to manage protected micro-contexts according to an embodiment of the present invention.

FIG. 1 illustrates processor 100, in system 190, according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Processor 100 may include multiple threads and multiple execution cores, in any combination. Processor 100 includes interface 110, virtual machine control logic 120, and memory management logic 130. Processor 100 may also include any other circuitry, structures, or logic not shown in FIG. 1.

Interface 110 may include a bus unit or any other unit, port, or interface to allow processor 100 to communicate with memory 180 through any type of bus, point to point, or other connection, directly or through any other component, such as a chipset or memory controller. Memory 180 may be dynamic random access memory, or any other type of medium readable by processor 100.

Virtual machine control logic 120 may include any circuitry, logic, microcode, or other structures to enable, assist, or support the sharing and/or allocating of resources among virtual machines running on processor 100, and the transfer of control from a VMM, having direct control over the resources, to guest software running within a virtual machine (a "VM entry"), and the transfer of control back to the VMM (a "VM exit").

Processor 100 also includes memory management logic 130 to manage the memory space of processor 100. Memory management logic supports the use of virtual memory to provide software, including guest software running in a VM, with an address space for storing and accessing code and data that is larger than the address space of the physical memory in the system, e.g., memory 180. The virtual memory space of processor 100 may be limited only by the number of address bits available to software running on the processor, while the physical memory space of processor 100 is further limited to the size of memory 180. Memory management logic 130 supports a memory management scheme, such as paging, to swap the executing software's code and data in and out of memory 180 on an as-needed basis. As part of this scheme, the software may access the virtual memory space of the processor with an untranslated address that is translated by the processor to a translated address that the processor may use to access the physical memory space of the processor.

Accordingly, memory management logic 130 includes one or more storage locations 132, one or more series of translation stages 134, determination logic 136, and translation lookaside buffer ("TLB") 138. Translation stages 134 include translation logic 135 to perform address translations, for example the translation of a virtual, logical, linear, or other untranslated address to a physical or other translated address, according to any known memory management technique, such as paging. To perform these address translations, translation stages 134 refer to one or more data structures stored in processor 100, memory 180, any other storage location in system 190 not shown in FIG. 1, and/or any combination of these locations. The data structures may include page directories and page tables according to the architecture of the Pentium® Processor Family, as modified according to embodiments of the present invention, and/or a table stored in TLB 138.

Storage location 132 may be any register or other storage location used to store a pointer to a data structure used by translation stages 134. In one embodiment, storage location 132 may be that portion of the CR3 register referred to as PML4 Base, used to store the page map level 4 base address, according to the architecture of the Pentium® Processor Family.

In one embodiment, translation stages 134 receive a linear address provided by an instruction to be executed by processor 100. Translation stages 134 use portions of the linear address as indices info hierarchical tables, including page tables, to perform a page walk. The page tables contain entries, each including a field for a base address of a page in memory 180, for example, bits 39:12 of a page table entry according to the Pentium® Processor Family's Extended Memory 64 Technology. Any page size (e.g., 4 kilobytes) may be used within the scope of the present invention. Therefore, the linear address used by a program to access memory 180 may be translated to a physical address used by processor 100 to access memory 180.

The linear address and the corresponding physical address may be stored in TLB 138, so that the appropriate physical address for future accesses using the same linear address may be found in TLB 138 and another page walk is not required. The contents of TLB 138 may be flushed when appropriate, for example on a context switch, typically by an operating system.

In a virtual machine environment, a VMM may need to have ultimate control over the resources of memory management logic 130 in order to protect the memory space of one guest from another guest. Therefore, in one embodiment, virtual machine control logic 120 may include logic to cause a VM exit if a guest issues an instruction that is intended to change the contents of storage location 132 or TLB 138, or otherwise modify the operation of memory management logic 130. The VMM may then maintain memory management logic 130 along with multiple sets of paging or other data structures (e.g., one set per VM) to provide for correct operation of system 190 such that each virtual machine appears to provide complete control of its memory management resources to an OS.

In another embodiment, memory management logic 130 may include hardware to support virtual machines. For example, translation stages 134 may be configured to translate a linear address to a physical address, using a data structure pointed to by the contents of storage location 132, as described above. If this translation is performed for a guest, the linear address is referred to as a guest linear address, a resulting physical address is referred to as a guest physical address ("GPA"), and additional translations are needed to translate GPAs to host physical addresses ("HPA"s). These additional translations may use an additional series of translation stages 134, using additional data structures, the first of which may be pointed to by an additional storage location 132. In this embodiment, the storage location 132 and the translation data structures for the guest may be maintained by an OS running on a virtual machine, while the storage location 132 and the translation data structures for the host are maintained by the VMM. These additional translations may be enabled by a VM entry and disabled by a VM exit.

Typically, an entry in a translation data structure includes an address or a portion of an address that is combined, by translation logic 135, with a portion of the untranslated address to point to an entry in a successive translation data structure, i.e., a translation data structure for the next stage. However, an entry in the translation data structure for the last stage may be or may include a physical address of a location in memory 180. In an embodiment supporting virtual machines, an address from an entry in a data structure may undergo an additional translation before it is used as a pointer to the next stage. As an example, one embodiment may use page tables to translate a linear address to a physical address when not operating within a virtual machine. When operating within a virtual machine, these same page tables may be used, but between each page table and after the last, page table, an additional translation is performed, using a set of extended page tables, to translate a page table entry from a GPA to an HPA. After translation, a GPA and its corresponding HPA may be stored in TLB 138, so that another page walk is not required. Embodiments of the present invention may be implemented in page tables, extended page tables, and/or any other data structure used by memory management logic 130.

In one embodiment using extended page tables, storage location 130 is to store an HPA which is a pointer to the first extended page table. A first stage of translation stages 134 combines this pointer with a first portion (e.g., bits 38:30 of a 64-bit address) of a GPA to find an entry in the first extended page table. This entry includes an HPA that is a pointer to a second extended page table. A second stage of translation stages 134 combines this pointer with a second portion (e.g., bits 29:21 of the 64-bits address) of the GPA to find an entry in the second extended page table. This entry includes an HPA that is a pointer to a third extended page table. A third stage of translation stages 134 combines this pointer with a third portion (e.g., bits 20:12 of the 64-bit address) of the GPA to find an entry in the third extended page table. This entry includes the translated address.

However, an embodiment of the present invention provides for any entry in any of these three extended page tables to be a "transition" entry. Each entry may be formatted to include an address field (e.g., bits 59:12 of a 64-bit entry) and a transition indicator field (e.g., bit 3 of the 64-bit entry). Determination logic 136 reads the transition indicator field to determine whether an entry is a transition entry. In one embodiment, the transition indicator field is a single bit that may be set, by a VMM for example, to a value of '1' to indicate that the entry is a transition entry. If the entry is not a transition entry, then the entry is used as the address of the next extended page table or as the translated address, as described above. However, if the entry is a transition entry, then the address field of the transition entry is used as a pointer to a different extended page table for the first stage, and the translation process is restarted at the first stage.

Therefore, different micro-contexts may be created by using different sets of extended page tables, and an instruction from one micro-context may refer to an instruction or data in a different micro-context by including a transition entry in one of its extended page tables. Creation and maintenance of the micro-contexts may be performed by the VMM and/or any other supervisory or other entity. Creation may include assigning a micro-context to any information, such as instructions and/or data associated with program components, as it is stored in memory 180, by labeling the pages on which it is stored with an attribute that identifies the micro-context. For example, the attribute may be an eight bit "page color" value, similar to a pixel color value in a graphical display. A page may be labeled with its color by storing their color value in a field in the page table entry that points to the page.

Separate micro-contexts may be created by maintaining page tables such that, in the absence of transition page table entries, only pages of a first color or group of colors may be reached from a first page table pointer, only pages of a second color or group of colors may be reached from a second page table pointer, only pages of a third color or group of colors may be reached from a third page table pointer, and so on. Therefore, each micro-context has its own set of page tables, and, in the absence of transition page table entries, referencing one micro-context from a different micro-context requires a change to the value in storage location 132, which may be performed only by the VMM or other supervisory software responsible for protecting the micro-contexts, in some embodiments, exceptions to this protection scheme are possible, such as by using special colors to represent micro-contexts that are not protected, by using special colors to represent micro-contexts that are allowed to reference protected micro-contexts, and/or by using special fields in page table entries to mark pages as read-only or otherwise indicate that they may be referenced under certain conditions. In the presence of transition page table entries, the VMM may protect micro-contexts by having exclusive access to write to the transition indicator field of page table entries and/or to store transition page table entries in page tables.

Figure 2:
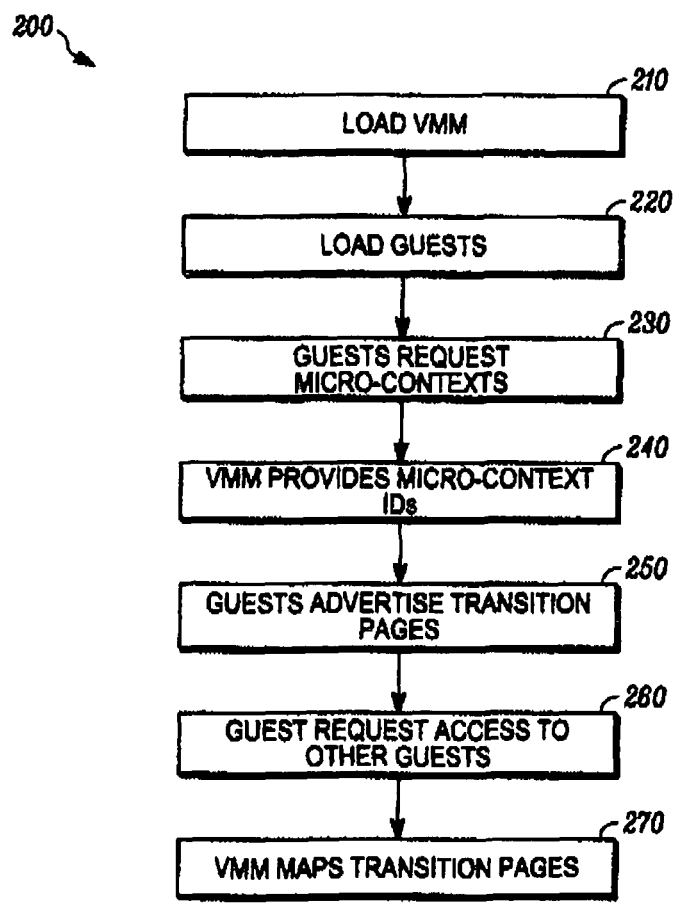
FIG. 2 illustrates a method for using a translation lookaside buffer to manage protected micro-contexts according to an embodiment of the present invention.

FIG. 2 illustrates method 200 for setting up protected micro-contexts using transition page table entries according to an embodiment of the present invention. In box 210, a VMM is loaded into memory. In box 220, the VMM loads guests into memory, in box 230, guests request separate micro-contexts for different pages or groups of pages from the VMM. In box 240, the VMM provides separate micro-context identifiers to the requesting guests for each separate micro-context. Each identifier corresponds to a different value for the extended page table pointer and therefore to a different set of extended page tables. In box 250, guests advertise, or otherwise make known to other guests, their transition pages, i.e., pages where they may be accessed by other guests. In box 260, guests make requests to the VMM to access other guests through their transition pages. In box 270, the VMM maps requested transition pages into the address space of the requesting guest by entering transition entries, pointing to the requested transition pages, into pages in the requesting guests' extended page tables.

Figure 3:
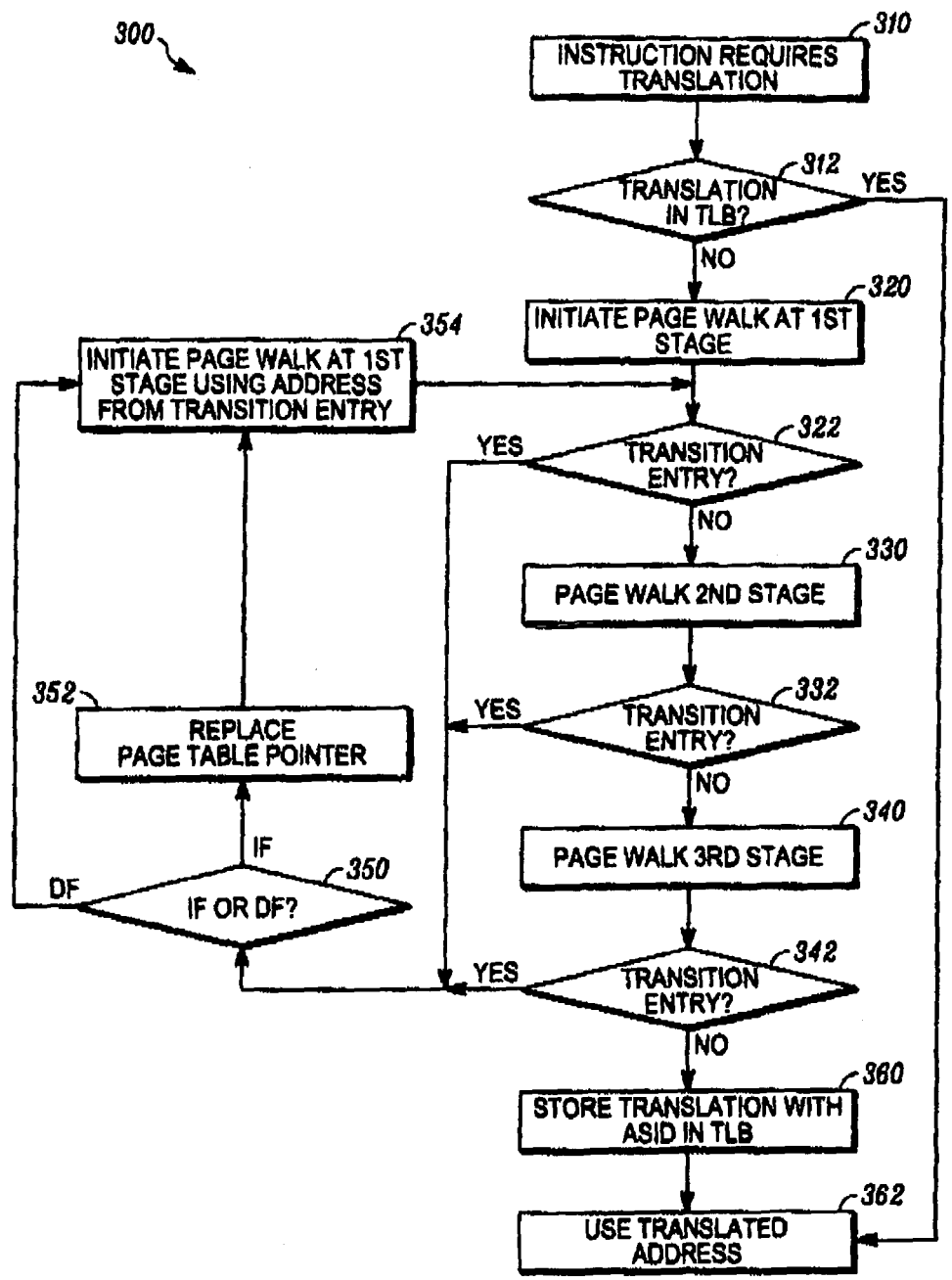
FIG. 3 illustrates a method for accessing a micro-context from a different micro-context through a transition entry in a page table according to an embodiment of the present invention.

FIG. 3 illustrates method 300 for accessing a micro-context from a different micro-context through a transition entry in a page table according to an embodiment of the present invention. In box 310, a guest issues an instruction requiring an address translation. In box 312, a TLB is checked for the translation. If a valid translation is found in the TLB, then the translated address provided by the TLB is used in box 362. However, if a valid translation is not found in the TLB, then a page walk through the extended page tables for the guest's micro-context is required.

In box 320, the page walk begins at a first stage, using the contents of the extended page table pointer register to find the first page table, and a first portion of a guest physical address to find an entry in the first page table. In box 322, it is determined whether the entry is a transition entry. If not, then in box 330, the page walk continues to the second stage, using the contents of the entry in the first page table to find the second page table, and a second portion of the guest physical address to find an entry in the second page table, in box 332, it is determined whether the entry is a transition entry. If not, then in box 340, the page walk continues to the third stage, using the contents of the entry in the second page table to find the third page table, and a third portion of the guest physical address to find an entry in the third page table. In box 342, it is determined whether the entry is a transition entry. If not, then the translation is stored with its address source identifier ("ASID") in the TLB (as described below) in box 360, and address portion of the entry is used as the translated address in box 362.

If, in any of boxes 322, 332, or 342, it is determined that the entry is a transition entry, then, in box 350, it is determined whether the page walk was the result of an instruction fetch or a data fetch. If the page walk was the result of an instruction fetch, then, in box 352 a micro-context switch is performed by replacing the contents of the extended page table pointer register with the address portion of the transition entry, and method 300 continues to box 354. If the page walk was the result of a data fetch, then box a micro-context switch is not performed; however, method 300 continues to box 354 to allow the guest to access data in a different micro-context.

In box 354, the page walk returns to the first stage, this time using the address portion of the transition entry to find the first page table, and the first portion of the guest physical address to find an entry in a first page table in a different micro-context. From box 354, the page walk continues to box 322.

Within the scope of the present invention, the methods illustrated in FIGS. 2 and 3 may be performed in a different order, with illustrated boxes omitted, with additional boxes added, or with a combination of reordered, omitted, or additional boxes. Note that a page walk may return to the first stage more than once, for example, when a transition entry points to a page table structure that includes another transition entry.

Many other embodiments are possible within the scope of the present invention.

In one embodiment, fields or bits in the format of a transition entry may be used to define access permissions. For example, for a data access, a read permission bit (e.g., bit 0) may be used to indicate whether a read is permitted and a write permission bit (e.g., bit 1) may be used to indicate whether a write is permitted. For an instruction fetch, an execution permission bit (e.g., bit 2) may be used to indicate whether an execution flow transition is permitted, and a transition type bit (e.g., bit 4) may be used to indicate a transition type. A first transition type may require determination logic 136 to check whether the target of the transition is aligned on a pre-determined boundary (e.g., a 64 byte boundary) before causing the transition, while a second transition type may require no such alignment check. If the values of any of these bits indicates that the access or transition is not permitted, then an error will be reported. Note that these types of permissions may be logically combined for each stage of a page walk (including a page walk through both IA32 page tables and extended page tables), such that the most restrictive of the permissions applies.

As described above, translations of GPAs to HPAs are stored in a TLB. A TLB entry for a GPA to HPA translation may include an ASID according to an embodiment of the present invention. An ASID is a value (e.g., a 2 to 8 bit integer) that identifies a unique micro-context. The ASID in a TLB entry indicates the micro-context for which the entry's translation is valid. During execution within any particular micro-context. TLB entries for the other micro-contexts may be treated as not valid. By including an ASID in TLB entries, entries do not need to be flushed when the processor switches from one micro-context to another. Therefore, these entries remain available across micro-context switches, reducing the number of page walks that need to be performed.

According to one embodiment, a TLB entry may include an ASID, a GPA, and the HPA to which the GPA is translated by a page walk initiated in the micro-context identified by the ASID. This approach may be use for data fetch address translations, but should not be used for instruction fetch address translations. The reason is that instruction fetch address translations through a valid transition entry, according to embodiments of the present invention, should result in a change to the page table pointer. However, if the final HPA for the GPA is in the TLB, the processor would consider it a TLB hit and would not change the page table pointer.

Therefore, another approach may be used for instruction fetch address translations (this approach may also be used for data fetch address translations, but it may be slower because more passes through the TLB are needed). According to this approach, for a translation of a GPA to an HPA that goes through one or more transition entries, TLB entries are made for each transition entry. Instead of storing the GPA and the final HPA, the GPA is stored with the HPA from the address field of the transition entry. These entries are marked in the TLB as transition entries, so that the processor may determine that another GPA to HPA translation is needed, this time in the micro-context of the address from the transition entry, and the page table pointer may be changed.

The permission bits described above may also be stored in the TLB, and the most restrictive of these may be applied for multiple passes through the TLB.

Also, the TLB may be maintained by a VMM to flush the GPA to HPA translation entries for all micro-contexts that may be reached from a given value of CR3, so that the TLB is properly updated when an OS changes contexts.

Processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention for using a TLB to manage protected micro-contexts have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
an interface to perform a transaction to fetch information from a memory; and
memory management logic to translate an untranslated address to a memory address, including:
a storage location to store a first address of an initial data structure for a first walk through a first set of translation stages;
a plurality of translation stages comprising the first set of translation stages and a second set of translation stages, the first set of translation stages reserved for a first context, the second set of translation stages reserved for a second context, each translation stage of the plurality of translation stages including translation logic and a data structure, the translation logic to find a particular entry of a plurality of entries in the data structure based on a corresponding portion of the untranslated address, each entry of the plurality of entries in the data structure to store a transition indicator to indicate a context switch from the first context to the second context;
determination logic to:
determine, during the first walk through the first set of translation stages, whether the particular entry of the plurality of entries in the data structure is a transition entry for the context switch from the first context to the second context based at least in part on the transition indicator of the particular entry;
in response to a determination that the particular entry is a transition entry, initiate a second walk through the second set of translation stages to cause the context switch from the first context to the second context; and
a translation lookaside buffer to store translations.

2. The processor of claim 1, wherein each entry of the plurality of entries in the data structure is further to store one of a second address of an initial data structure for the second set of translation stages, an address of a data structure for a successive translation stage, and the memory address.

3. The processor of claim 1, wherein the determination logic is also to, if the particular entry is a transition entry and the transaction is an instruction fetch, replace the first address of the initial data structure for the first set of translation stages stored in the storage location with a second address of an initial data structure for a second set of translation stages.

4. The processor of claim 3, wherein the determination logic is also to initiate the second walk through the second set of translation stages using the second address stored in the storage location.

5. The processor of claim 1, wherein each translation lookaside buffer entry is to include an address source identifier.

6. The processor of claim 5, wherein each address source identifier identifies a unique micro-context.

7. The processor of claim 1, wherein the data structures are extended page tables to support address translations from guest physical addresses to host physical addresses.

8. The processor of claim 1, wherein the transition entry is to enable an instruction of the first context to reference the second context.

9. The processor of claim 1, wherein a first translation stage of the first set of translation stages to use a first portion of the untranslated address, a second translation stage of the first set of translation stages to use a second portion of the untranslated address, and a third translation stage of the first set of translation stages to use a third portion of the untranslated address.

10. The processor of claim 1, wherein the first context is associated with a first virtual machine, and the second context is associated with a second virtual machine.

11. A system comprising:
a memory; and
a processor including:
   an interface to perform a transaction to fetch information from the memory; and
   memory management logic to translate an untranslated address to a memory address, including:
      a storage location to store a first address of an initial data structure for a first walk through a first set of translation stages;
      a plurality of translation stages comprising the first set of translation stages and a second set of translation stages, the first set of translation stages reserved for a first context, the second set of translation stages reserved for a second context, each translation stage of the plurality of translation stages including translation logic and a data structure, the translation logic to find a particular entry of a plurality of entries in the data structure based on a corresponding portion of the untranslated address, each entry of the plurality of entries in the data structure to store a transition indicator to indicate a context switch from the first context to the second context;
      determination logic to:
         determine, during the first walk through the first set of translation stages, whether the particular entry of the plurality of entries in the data structure is a transition entry for the context switch from the first context to the second context based at least in part on the transition indicator of the particular entry;
         in response to a determination that the particular entry is a transition entry, initiate a second walk through the second set of translation stages to cause the context switch from the first context to the second context; and
      a translation lookaside buffer to store translations.

12. The system of claim 11, wherein each entry of the plurality of entries in the data structure is further to store one of a second address of an initial data structure for the second set of translation stages, an address of a data structure for a successive translation stage, and the memory address.

13. The system of claim 11, wherein the determination logic is also to, if the particular entry is a transition entry and the transaction is an instruction fetch, replace the first address of the initial data structure for the first set of translation stages stored in the storage location with a second address of an initial data structure for the walk through the second set of translation stages.

14. The system of claim 13, wherein the determination logic is also to initiate the second walk through the second set of translation stages using the second address stored in the storage location.

15. The system of claim 11, wherein each translation lookaside buffer entry is to include an address source identifier.

16. The system of claim 15, wherein each address source identifier identifies a unique micro-context.

17. The system of claim 11, wherein the data structures are extended page tables to support address translations from guest physical addresses to host physical addresses.

18. The system of claim 11, wherein the transition entry is to enable an instruction of the first context to reference the second context.

19. The system of claim 11, wherein a first translation stage of the first set of translation stages to use a first portion of the untranslated address, a second translation stage of the first set of translation stages to use a second portion of the untranslated address, and a third translation stage of the first set of translation stages to use a third portion of the untranslated address.

20. The system of claim 11, wherein the first context is associated with a first virtual machine, and the second context is associated with a second virtual machine.

* * * * *